United States Patent
Shimada

(10) Patent No.: US 9,106,917 B2
(45) Date of Patent: Aug. 11, 2015

(54) VIDEO ENCODING APPARATUS AND VIDEO ENCODING METHOD

(75) Inventor: Satoshi Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 537 days.

(21) Appl. No.: 12/791,205

(22) Filed: Jun. 1, 2010

(65) Prior Publication Data

US 2010/0309978 A1 Dec. 9, 2010

(30) Foreign Application Priority Data

Jun. 3, 2009 (JP) ................................. 2009-133897

(51) Int. Cl.
- H04N 19/18 (2014.01)
- H04N 19/176 (2014.01)
- H04N 19/119 (2014.01)
- H04N 19/134 (2014.01)
- H04N 19/61 (2014.01)
- H04N 19/11 (2014.01)

(52) U.S. Cl.
CPC .............. *H04N 19/18* (2014.11); *H04N 19/11* (2014.11); *H04N 19/119* (2014.11); *H04N 19/134* (2014.11); *H04N 19/176* (2014.11); *H04N 19/61* (2014.11)

(58) Field of Classification Search
CPC .............. H04N 19/00072; H04N 19/00296; H04N 19/00042; H04N 19/00133; H04N 19/00781; H04N 19/00278; H04N 19/19; H04N 19/11; H04N 19/134; H04N 19/176; H04N 19/18; H04N 19/61
USPC ................................................... 375/240.13
See application file for complete search history.

(56) References Cited

U.S. PATENT DOCUMENTS

| | | | |
|---|---|---|---|
| 8,369,411 B2* | 2/2013 | Au et al. | 375/240.24 |
| 8,634,456 B2* | 1/2014 | Chen et al. | 375/240 |
| 2006/0133489 A1* | 6/2006 | Watanabe et al. | 375/240.12 |

(Continued)

FOREIGN PATENT DOCUMENTS

| | | |
|---|---|---|
| JP | 2006-94081 | 4/2006 |
| JP | 2006-180195 | 7/2006 |

(Continued)

OTHER PUBLICATIONS

Japanese Office Action issued Aug. 28, 2012 in corresponding Japanese Patent Application No.

*Primary Examiner* — Behrooz Senfi
*Assistant Examiner* — Maria Vazquez Colon
(74) *Attorney, Agent, or Firm* — Staas & Halsey LLP

(57) ABSTRACT

A video encoding method and apparatus performing intra-frame prediction in units of a sub-block determined by any one of two or more block sizes is provided. The method includes generating a prediction image in each of a plurality of intra-frame prediction modes in units of the sub-block determined by each block size, calculating a first evaluation value on the basis of the difference images between an original image and the prediction images in the intra-frame prediction modes for the sub-blocks determined by each block size, accumulating values indicating frequency characteristics of the original image for the sub-blocks determined by each block size in units of a macroblock to obtain a second evaluation value, and selecting one of the two or more block sizes on the basis of the first evaluation values and the second evaluation values.

18 Claims, 12 Drawing Sheets

(56) References Cited

U.S. PATENT DOCUMENTS

2007/0121731 A1    5/2007   Tanizawa et al.
2007/0171978 A1*   7/2007   Chono .................... 375/240.18

FOREIGN PATENT DOCUMENTS

| | | |
|---|---|---|
| WO | 2006/070614 A1 | 7/2006 |
| WO | 2007/063808 A1 | 6/2007 |

* cited by examiner

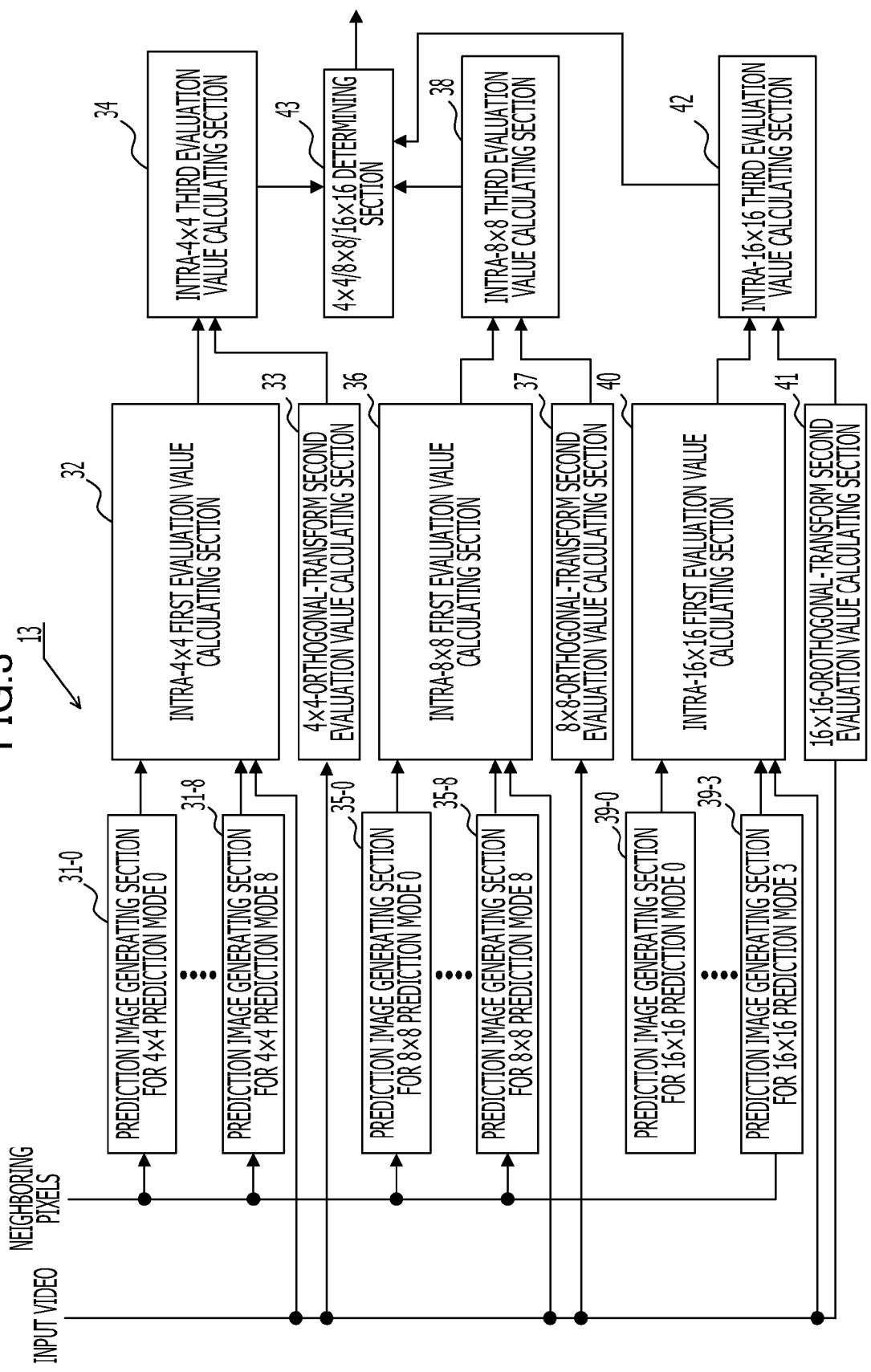

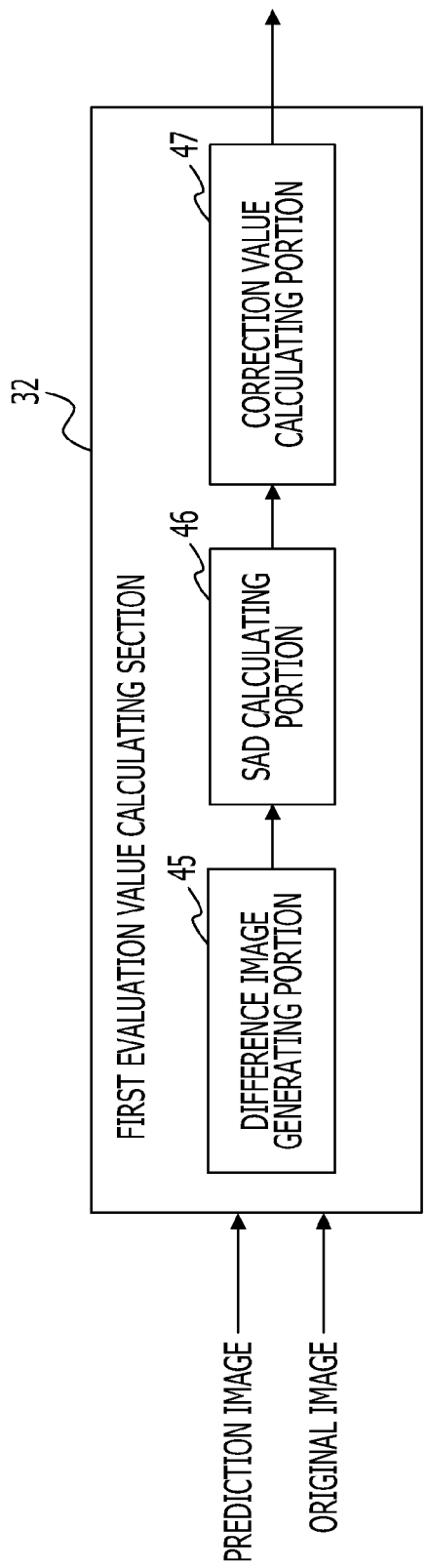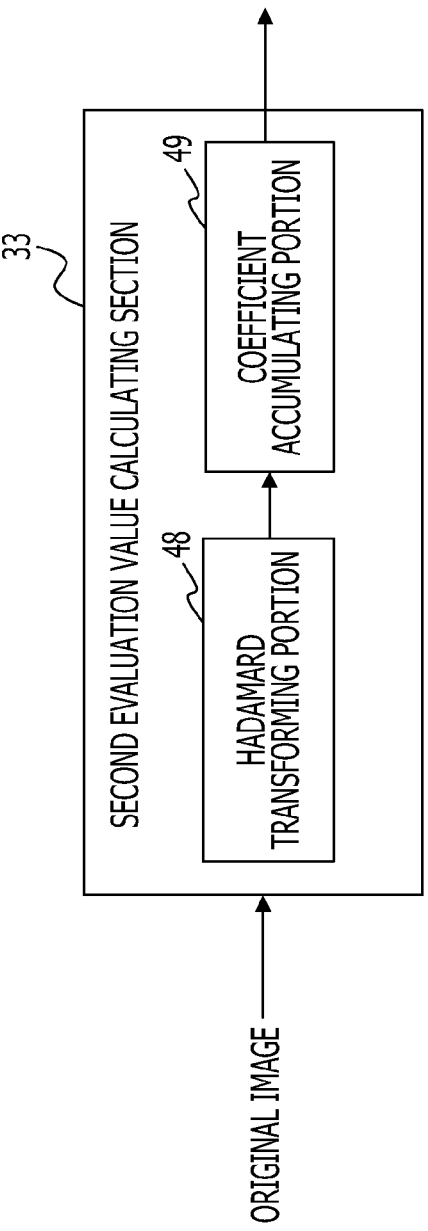

FIG.6A $$H_4 = \frac{1}{\sqrt{2}}\begin{pmatrix} 1 & 1 & 1 & 1 \\ 1 & 1 & -1 & -1 \\ 1 & -1 & -1 & 1 \\ 1 & -1 & 1 & -1 \end{pmatrix}$$

FIG.6B $$H_8 = \frac{1}{\sqrt{2}}\begin{pmatrix} H_4 & H_4 \\ H_4 & -H_4 \end{pmatrix} = \frac{1}{2}\begin{pmatrix} 1 & 1 & 1 & 1 & 1 & 1 & 1 & 1 \\ 1 & 1 & -1 & -1 & 1 & 1 & -1 & -1 \\ 1 & -1 & -1 & 1 & 1 & -1 & -1 & 1 \\ 1 & -1 & 1 & -1 & 1 & -1 & 1 & -1 \\ 1 & 1 & 1 & 1 & -1 & -1 & -1 & -1 \\ 1 & 1 & -1 & -1 & -1 & -1 & 1 & 1 \\ 1 & -1 & -1 & 1 & -1 & 1 & 1 & -1 \\ 1 & -1 & 1 & -1 & -1 & 1 & -1 & 1 \end{pmatrix}$$

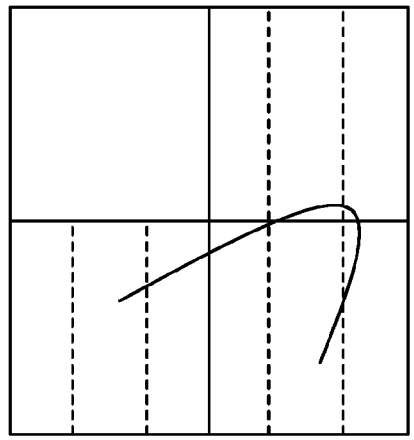
FIG.8C
8×8
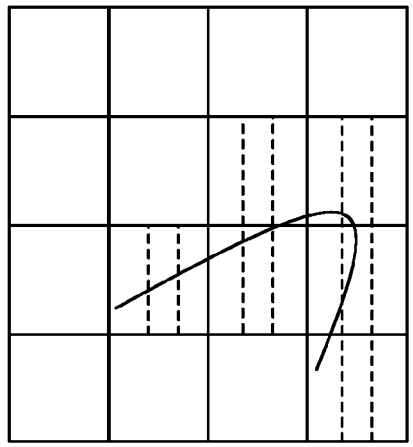
FIG.8B
4×4
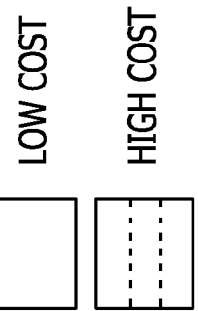
LOW COST
HIGH COST
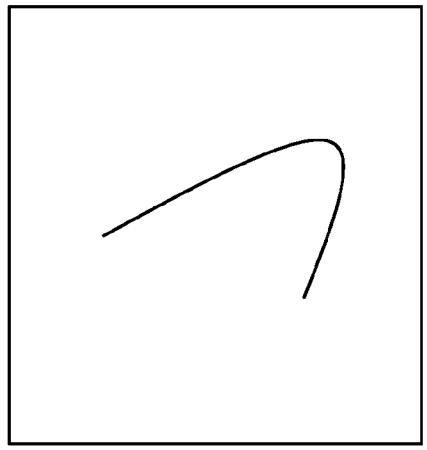
FIG.8A
ORIGINAL IMAGE

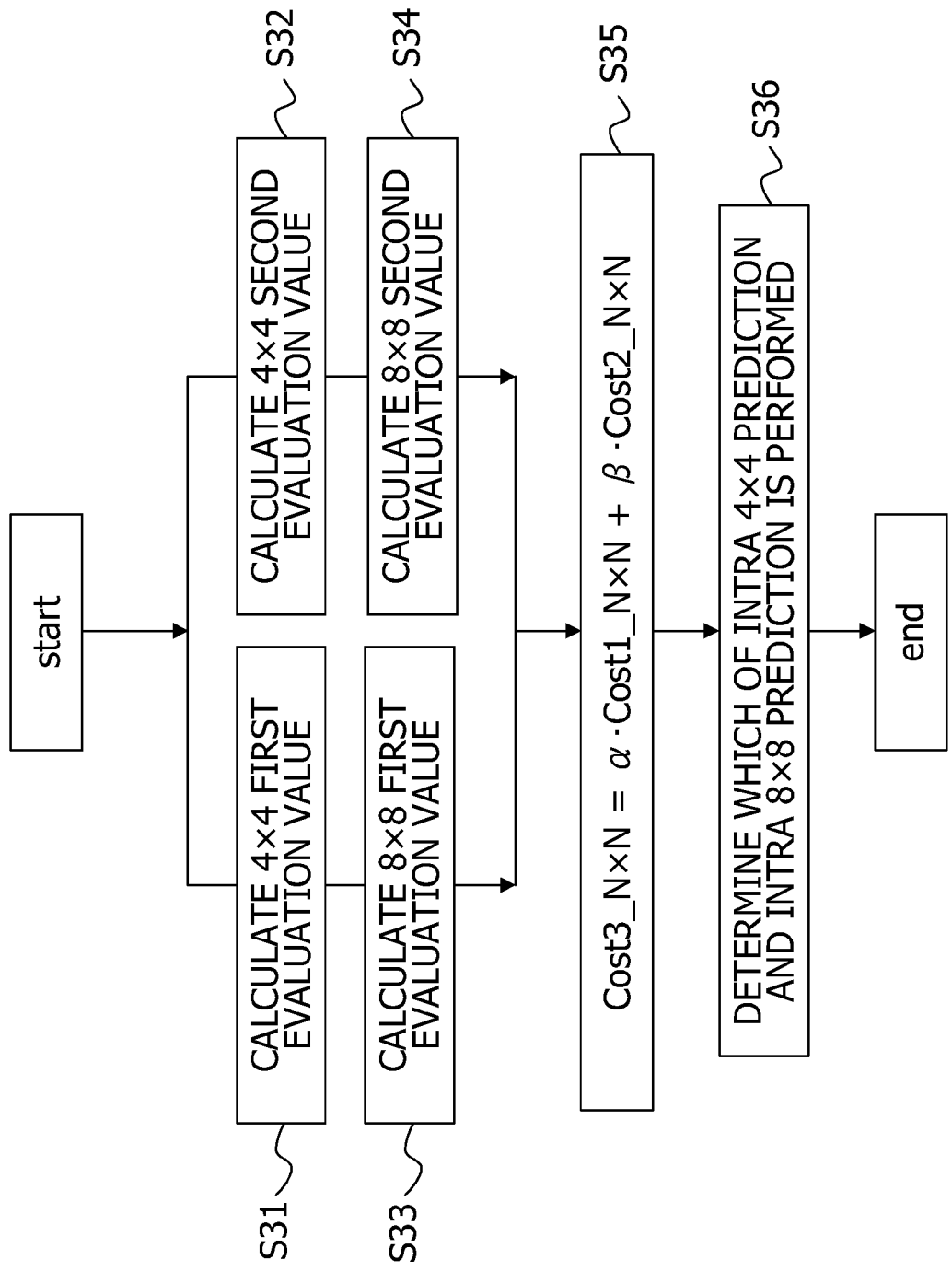

FIG.11

| 128 | 128 | 128 | 128 | 128 | 128 | 128 | 128 | 128 | 128 | 128 | 128 | 128 | 128 | 128 | 128 | 128 | 128 |
|---|---|---|---|---|---|---|---|---|---|---|---|---|---|---|---|---|---|
| 128 | 128 | 128 | 128 | 128 | 128 | 128 | 128 | 128 | 128 | 128 | 128 | 128 | 128 | 128 | 128 | 128 | 128 |
| 128 | 128 | 128 | 128 | 128 | 128 | 128 | 128 | 128 | 128 | 128 | 128 | 128 | 128 | 128 | 128 | 128 | 128 |
| 128 | 128 | 128 | 128 | 128 | 128 | 128 | 128 | 128 | 128 | 128 | 128 | 128 | 128 | 128 | 128 | 128 | 128 |
| 128 | 128 | 128 | 128 | 128 | 128 | 128 | 128 | 128 | 128 | 128 | 128 | 128 | 128 | 128 | 128 | 128 | 128 |
| 128 | 128 | 128 | 0 | 128 | 128 | 128 | 128 | 128 | 128 | 128 | 128 | 128 | 128 | 128 | 128 | 128 | 128 |
| 128 | 128 | 128 | 128 | 16 | 0 | 16 | 128 | 128 | 128 | 128 | 16 | 0 | 16 | 128 | 128 | 128 | 128 |
| 128 | 128 | 128 | 128 | 0 | 16 | 0 | 128 | 128 | 128 | 128 | 0 | 16 | 0 | 128 | 128 | 128 | 128 |
| 128 | 128 | 128 | 128 | 16 | 0 | 16 | 128 | 128 | 128 | 128 | 16 | 0 | 16 | 128 | 128 | 128 | 128 |
| 128 | 128 | 128 | 128 | 128 | 128 | 128 | 128 | 128 | 128 | 128 | 128 | 128 | 128 | 128 | 128 | 128 | 128 |
| 128 | 128 | 128 | 128 | 128 | 128 | 128 | 128 | 128 | 128 | 128 | 128 | 128 | 128 | 128 | 128 | 128 | 128 |
| 128 | 128 | 128 | 128 | 128 | 128 | 128 | 0 | 16 | 0 | 128 | 128 | 128 | 128 | 128 | 128 | 128 | 128 |
| 128 | 128 | 128 | 128 | 128 | 128 | 128 | 16 | 0 | 16 | 128 | 128 | 128 | 128 | 128 | 128 | 128 | 128 |
| 128 | 128 | 128 | 128 | 128 | 128 | 128 | 0 | 16 | 0 | 128 | 128 | 128 | 128 | 128 | 128 | 128 | 128 |
| 128 | 128 | 128 | 128 | 128 | 128 | 128 | 128 | 128 | 128 | 128 | 128 | 128 | 128 | 128 | 128 | 128 | 128 |
| 128 | 128 | 128 | 128 | 128 | 128 | 128 | 128 | 128 | 128 | 128 | 128 | 128 | 128 | 128 | 128 | 128 | 128 |
| 128 | 128 | 128 | 128 | 128 | 128 | 128 | 128 | 128 | 128 | 128 | 128 | 128 | 128 | 128 | 128 | 128 | 128 |
| 128 | 128 | 128 | 128 | 128 | 128 | 128 | 128 | 128 | 128 | 128 | 128 | 128 | 128 | 128 | 128 | 128 | 128 |

FIG.12A

SUMS SAT4(blk-idx) FOR 4×4 SUB-BLOCKS

| 0 | 0 | 0 | 0 |
| 960 | 1448 | 0 | 0 |
| 0 | 792 | 1480 | 0 |
| 896 | 608 | 1232 | 0 |

FIG.12B

SUMS SAT8(blk-idx) FOR 8×8 SUB-BLOCKS

| 4132 | 0 |
| 3644 | 4068 |

VIDEO ENCODING APPARATUS AND VIDEO ENCODING METHOD

CROSS-REFERENCE TO RELATED APPLICATIONS

This application is based upon and claims the benefit of priority of the prior Japanese Patent Application No. 2009-133897, filed on Jun. 3, 2009, the entire contents of which are incorporated herein by reference.

FIELD

Various embodiments described herein relate to a technique and apparatus for video compression encoding.

BACKGROUND

In H.264/MPEG-4 Part 10 (ISO/IEC 14496-10), regarding intra-frame prediction for luminance (luma) components, nine prediction modes for each 4×4 block and nine prediction modes for each 8×8 block are defined. In addition, four prediction modes for each 16×16 block are defined. Regarding intra-frame prediction for chrominance (chroma) components, four prediction modes for each 8×8 block are defined.

In the reference software Joint Model (JM) distributed by the organization for H.264 standardization, the sum of absolute differences (SAD) and the sum of absolute transformed differences (SATD) are used as evaluation measures for selection of an intra-frame prediction mode. However, a cost value upon prediction mode selection is obtained using any one of SAD and SATD.

SAD is the sum of absolute differences as the values of difference between an original image signal and a prediction signal. SATD is the sum of absolute values of Hadamard transform coefficients for the difference signal between the original signal and the prediction signal. The amount of calculation in Hadamard transform is remarkably larger than that in SAD operation.

Japanese Unexamined Patent Application Publication No. 2006-180195 discusses the following related art. To reduce the amount of SATD calculation in the above-described reference software JM, the direction of prediction (hereinafter, also referred to as "prediction direction") is temporarily determined for each block size by SAD operation and SATD operation is performed on a difference image generated in the temporarily determined prediction direction for each block size. A block size is determined on the basis of the results of operation, thus reducing the number of SATD operation times.

Japanese Unexamined Patent Application Publication No. 2006-94081 discusses a related art technique in which an optimum prediction mode is selected from among a plurality of intra prediction modes and a plurality of inter prediction modes on the basis of cost values obtained by cost functions representing coding efficiencies and encoding is performed in the selected mode. According to the related art discussed in Japanese Unexamined Patent Application Publication No. 2006-94081, activity indicating a degree of flatness of an image is calculated and a cost value is corrected using the calculated activity, thus determining an optimum prediction mode.

SUMMARY

A video encoding method for performing intra-frame prediction in units of a sub-block determined by any one of two or more block sizes, the method includes generating a prediction image in each of a plurality of intra-frame prediction modes in units of the sub-block determined by each block size, calculating a first evaluation value based on a difference images between an original image and the prediction images in the intra-frame prediction modes for the sub-blocks determined by each block size, accumulating values indicating frequency characteristics of the original image for the sub-blocks determined by each block size in units of a macroblock to obtain a second evaluation value, and selecting one of the two or more block sizes based on the first evaluation values and the second evaluation values.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 3 is a diagram illustrating a configuration of an intra-frame predicting unit;

FIG. 4A is a diagram illustrating a configuration of a first evaluation value calculating section;

FIG. 4B is a diagram illustrating a configuration of a second evaluation value calculating section;

FIGS. 6A and 6B are diagrams illustrating the determinants of Hadamard transform;

FIGS. 8A, 8B, and 8C are diagrams explaining an original image and second evaluation values for 4×4 and 8×8 sub-blocks;

FIG. 9 is a flowchart of a block size determining process;

FIG. 11 is a diagram illustrating pixel values of 16×16 pixels;

FIG. 12A is a diagram illustrating the sums of absolute values of Hadamard transform coefficients for 4×4 sub-blocks; and FIG. 12B is a diagram illustrating the sums of absolute values of Hadamard transform coefficients for 8×8 sub-blocks.

DETAILED DESCRIPTION

Figure 1:
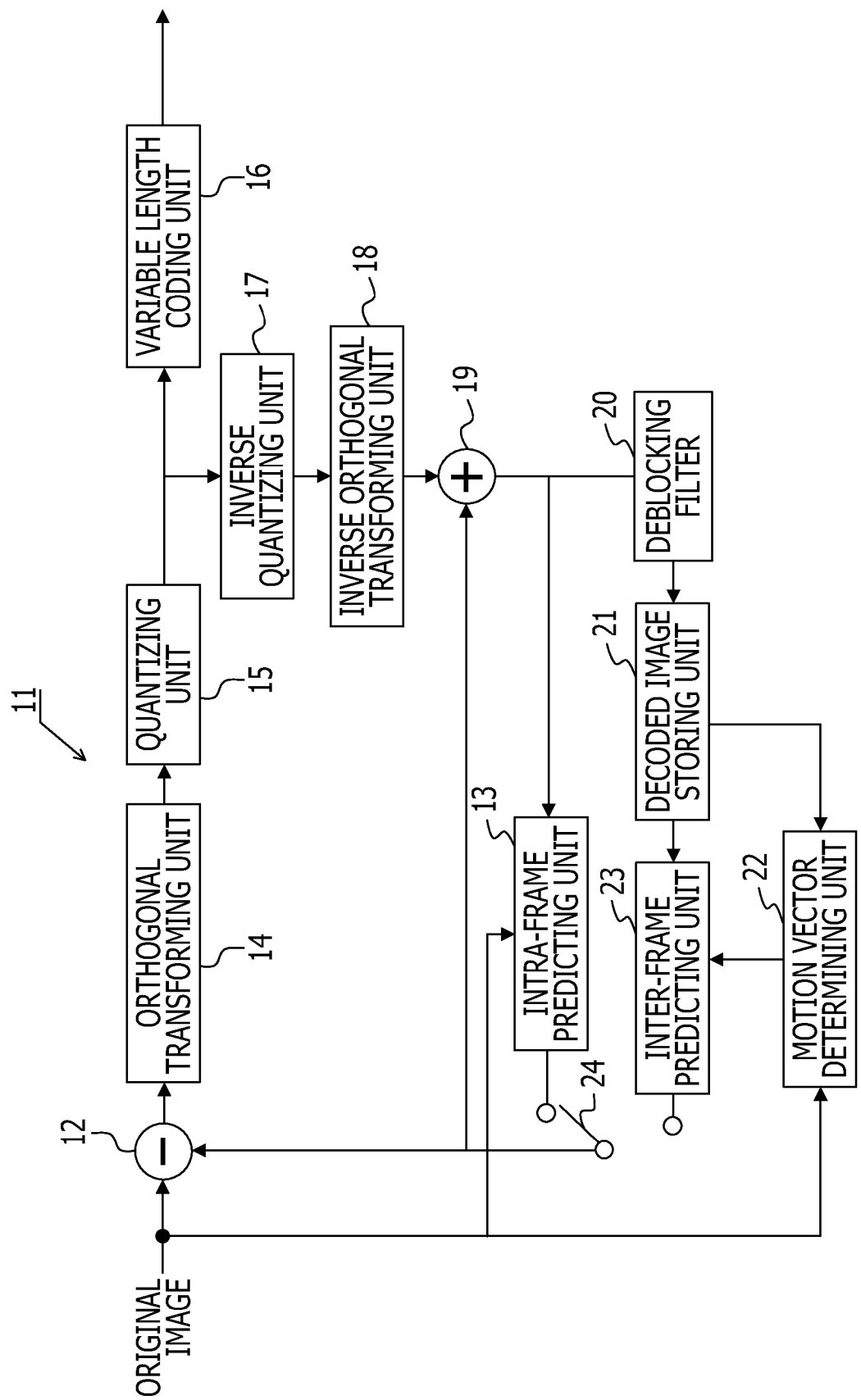
FIG. 1 is a diagram illustrating a configuration of a video encoding apparatus according to an embodiment.

Reference will now be made in detail to the embodiments, examples of which are illustrated in the accompanying drawings, wherein like reference numerals refer to the like elements throughout. The embodiments are described below to explain the present invention by referring to the figures.

Exemplary problems to be solved by the present application will now be described below.

According to the method of temporarily determining the direction of prediction by SAD operation, after the prediction direction is temporarily determined, SATD operation has to be performed in order to determine a block size. Accordingly, it is necessary to sequentially perform SAD operation and Hadamard transform. This, among other problems, disadvantageously lowers processing speed.

According to H.264, an intra-frame prediction signal is generated using a decoded image of a neighboring block. If a process of generating the decoded image of the neighboring block is not finished, an intra-frame prediction signal cannot be generated. Accordingly, in intra prediction modes in H.264, it is generally difficult to perform parallel processing for blocks.

In H.264, a size for orthogonal transform is equal to a sub-block size for intra-frame prediction. Alternatively, a smaller size different from the sub-block size for intra-frame prediction can be selected for orthogonal transform. In this case, it is necessary to calculate SATD by performing Hadamard transform for different sizes on each difference image. Disadvantageously, this results in an increased throughput. The reason is that frequency-transformed values for blocks of different sizes have to be calculated in all of the prediction directions for each piece of difference information in order to select an optimum prediction mode.

An object of the present invention is to provide a video encoding apparatus capable of selecting an optimum block size without increasing throughput.

Various embodiments of the present invention are described below. FIG. 1 is a diagram illustrating the configuration of a video encoding apparatus 11 according to an embodiment. Part or all of functions of this video encoding apparatus 11 are realized by hardware circuitry, such as an LSI.

An original image is input in units of a macroblock (MB) to a prediction error signal generating unit 12, an intra-frame predicting unit 13, and a motion vector determining unit 22.

The prediction error signal generating unit 12 subtracts a prediction image generated by the intra-frame predicting unit 13 or an inter-frame predicting unit 23 from the original image to generate a prediction error signal and outputs the generated prediction error signal to an orthogonal transforming unit 14. The prediction error signal generating unit 12 can be realized by, for example, a subtractor or any other circuit enabled to perform processing of signals.

The orthogonal transforming unit 14 performs orthogonal transform (e.g., discrete cosine transform (DCT)) on the prediction error signal in units of a predetermined size block and outputs a resultant signal to a quantizing unit 15. The quantizing unit 15 quantizes orthogonal transform coefficients of the orthogonally transformed prediction error signal using a quantization parameter. A variable length coding unit 16 performs variable length coding on quantized data.

The intra-frame predicting unit 13 calculates a sum of absolute differences between the original image and the prediction image in each of a plurality of prediction modes in units of each predetermined size sub-block or block of 4×4, 8×8, or 16×16 pixels and calculates a first evaluation value for the block size on the basis of the sums of absolute differences. As for each of the sub-block sizes of 4×4 and 8×8, the smallest values of the sums of absolute differences for sub-blocks are accumulated in units of a macroblock to obtain a first evaluation value. Furthermore, the intra-frame predicting unit 13 calculates a value indicating a frequency characteristics of the original image as a second evaluation value. For a value indicating the frequency characteristics of the original image, for example, the original image is subjected to orthogonal transform, the sum of absolute values of orthogonal transform coefficients for each sub-block subjected to the transform is calculated, and the sums are accumulated in units of a macroblock to obtain a second evaluation value. In addition, a prediction mode and a block size which provide high coding efficiency are determined on the basis of the first and second evaluation values and intra-frame prediction is performed in the determined mode using the determined block size.

An inverse quantizing unit 17 performs processing inverse to that by the quantizing unit 15. An inverse orthogonal transforming unit 18 performs processing inverse to that by the orthogonal transforming unit 14. A decoded-image generating unit 19 adds image data obtained by inverse transform through the inverse orthogonal transforming unit 18 to the prediction image, thus decoding the original image. A deblocking filter 20 removes distortion on block boundaries. An image obtained by removing block distortion through the deblocking filter 20 is stored into a decoded-image storing unit 21.

The motion vector determining unit 22 calculates a motion vector on the basis of the input original image and the decoded image (hereinafter, referred to as "reference image") output from the decoded-image storing unit 21 and outputs the calculated motion vector to the inter-frame predicting unit 23. The motion vector calculated by the motion vector determining unit 22 is also output to the variable length coding unit 16.

The inter-frame predicting unit 23 generates an inter-frame prediction image on the basis of the motion vector and the reference image and outputs the generated inter-frame prediction image through a switch 24 to the prediction error signal generating unit 12 and the decoded-image generating unit 19. The switch 24 selects either of an intra-frame prediction code generated by the intra-frame predicting unit 13 and an inter-frame prediction code generated by the inter-frame predicting unit 23 as a reference image and outputs the selected code to the prediction error signal generating unit 12.

The H.264 intra-frame prediction modes will now be described with reference to FIG. 2.

The 9 prediction modes (0 to 8) are defined as 4×4-pixel intra-frame prediction modes. Numerals assigned to arrows in FIG. 2 indicate prediction mode numbers. The prediction mode 2 is DC prediction and is not illustrated in FIG. 2 because this mode has no prediction direction.

Figure 2:
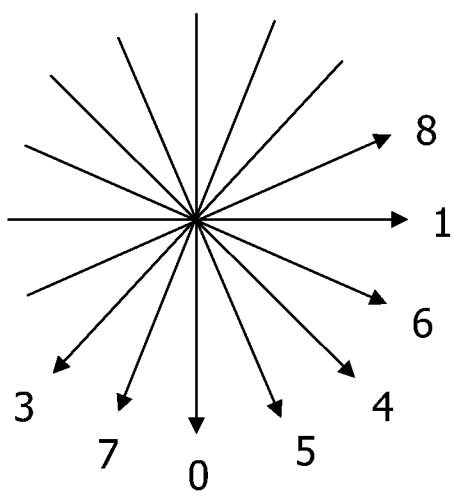
FIG. 2 is a diagram illustrating directions of prediction in intra-frame prediction modes.

The prediction direction of the prediction mode 0 is assigned "0" in FIG. 2. Pixel values of 4×4 pixels are predicted from encoded pixel values of four neighboring pixels of the upper block. In this prediction mode 0, the pixel values of the four neighboring pixels of the upper block are used as prediction values for pixels in the same columns.

The prediction direction of the prediction mode 1 is assigned "1" in FIG. 2. Pixels values of 4×4 pixels are predicted from encoded pixel values of four neighboring pixels of the left block.

In each of the prediction modes 3 to 6, similarly, the direction indicated by the arrow assigned the corresponding number in FIG. 2 is the prediction direction and pixel values of 4×4 pixels are predicted from encoded pixel values of four neighboring pixels of the neighboring block.

FIG. 3 is a diagram illustrating the configuration of the intra-frame predicting unit 13. In H.264, the nine modes are defined as 4×4-pixel sub-block prediction modes, the nine modes are defined as 8×8-pixel sub-block prediction modes, and the four modes are defined as 16×16-pixel block prediction modes. FIG. 3 illustrates a case where prediction image generating sections corresponding to the individual prediction modes are provided for the 4×4, 8×8, and 16×16 block sizes.

Referring to FIG. 3, prediction image generating sections 31-0 to 31-8 for the 4×4 prediction modes 0 to 8 generate prediction images in the nine intra-frame prediction modes in units of a 4×4-pixel sub-block. For example, the prediction image generating section 31-0 for the prediction mode 0 generates encoded pixel values of four neighboring pixels of the upper block as prediction values of 4×4 pixels. The prediction image generating section 31-1 for the prediction mode 1 generates encoded pixel values of four neighboring pixels of the left block as prediction values of 4×4 pixels.

A first evaluation value calculating section 32 for intra (intra-frame) 4×4 prediction (hereinafter, referred to as "intra-4×4 first evaluation value calculating section 32") calculates the sum of absolute differences (SAD) between the original image and each of the prediction images in the prediction modes output in units of a 4×4 sub-block from the prediction image generating sections 31-0 to 31-8 for the prediction modes 0 to 8. The intra-4×4 first evaluation value calculating section 32 determines the prediction mode relevant to the smallest value of the SADs for the prediction modes as an optimum prediction mode and stores the prediction mode number and the smallest SAD. In addition, the intra-4×4 first evaluation value calculating section 32 accumulates the smallest SADs for the sub-blocks in units of a macroblock to obtain an intra-4×4 first evaluation value.

A second evaluation value calculating section 33 for 4×4 orthogonal transform (hereinafter, referred to as "4×4-orthogonal-transform second evaluation value calculating section 33") performs orthogonal transform on input video (original image) in units of a 4×4 sub-block and calculates the sum of absolute values of orthogonal transform coefficients (SAT). In addition, the 4×4-orthogonal-transform second evaluation value calculating section 33 accumulates the SATs for sub-blocks in units of a macroblock to obtain an intra-4×4 second evaluation value.

A third evaluation value calculating section 34 for intra 4×4 prediction (hereinafter, referred to as "intra-4×4 third evaluation value calculating section 34") calculates the sum of the product of the intra-4×4 first evaluation value and a desired weighting factor and the product of the intra-4×4 second evaluation value and another desired weighting factor to obtain an intra-4×4 third evaluation value.

Prediction image generating sections 35-0 to 35-8 for the 8×8 prediction modes 0 to 8 generate prediction images corresponding to the nine prediction modes in units of an 8×8-pixel sub-block.

A first evaluation value calculating section 36 for intra 8×8 prediction (hereinafter, "intra-8×8 first evaluation value calculating section 36") calculates the SAD between the original image and each of the prediction images output in units of an 8×8 sub-block from the prediction image generating sections 35-0 to 35-8 for the 8×8 prediction modes 0 to 8. The intra-8×8 first evaluation value calculating section 36 determines the prediction mode relevant to the smallest value of the SADs for the prediction modes as an optimum prediction mode and stores the prediction mode number and the smallest SAD. In addition, the intra-8×8 first evaluation value calculating section 36 accumulates the smallest SADs for sub-blocks in units of a macroblock to obtain an intra-8×8 first evaluation value.

A second evaluation value calculating section 37 for 8×8 orthogonal transform (hereinafter, referred to as "8×8-orthogonal-transform second evaluation value calculating section 37") performs orthogonal transform on the input video (original image) in units of an 8×8 sub-block and calculates the SAT. In addition, the 8×8-orthogonal-transform second evaluation value calculating section 37 accumulates the SATs for sub-blocks in units of a macroblock to obtain an intra-8×8 second evaluation value.

A third evaluation value calculating section 38 for intra 8×8 prediction (hereinafter, referred to as "intra-8×8 third evaluation value calculating section 38") calculates the sum of the product of the intra-8×8 first evaluation value and the desired weighting factor and the product of the intra-8×8 second evaluation value and the other desired weighting factor to obtain an intra-8×8 third evaluation value.

Prediction image generating sections 39-0 to 39-3 for the 16×16 prediction modes 0 to 3 generate prediction images in the four intra-frame prediction modes in units of a block of 16×16 pixels.

A first evaluation value calculating section 40 for intra 16×16 prediction (hereinafter, "intra-16×16 first evaluation value calculating section 40") calculates the SAD between the original image and each of the prediction images output in units of a 16×16 block from the prediction image generating sections 39-0 to 39-3 for the 16×16 prediction modes 0 to 3. The intra-16×16 first evaluation value calculating section 40 determines the prediction mode relevant to the smallest value of the SADs in the prediction modes as an optimum prediction mode and stores the prediction mode number and the smallest SAD as an intra-16×16 first evaluation value.

A second evaluation value calculating section 41 for 16×16 orthogonal transform (hereinafter, referred to as "16×16-orthogonal-transform second evaluation value calculating section 41") performs orthogonal transform on the original image in units of a 16×16 block and calculates the SAT after transform as an intra-16×16 second evaluation value.

A third evaluation value calculating section 42 for intra 16×16 prediction (hereinafter, referred to as "intra-16×16 third evaluation value calculating section 42") calculates the sum of the product of the intra-16×16 first evaluation value and the desired weighting factor and the product of the intra-16×16 second evaluation value and the other desired weighting factor to obtain an intra-16×16 third evaluation value.

A 4×4/8×8/16×16 determining section 43 determines a block size relevant to a smallest value among the intra-4×4 third evaluation value, the intra-8×8 third evaluation value, and the intra-16×16 third evaluation value to select the block size.

Although the prediction image generating sections for all of the block sizes and all of the prediction modes, the first evaluation value calculating sections for all of the block sizes, and the second evaluation value calculating sections for all of the block sizes are illustrated in FIG. 3 for easy understanding of description, it is unnecessary to provide all of the above-described sections. For example, when only evaluation values obtained by division into 4×4 sub-blocks and only evaluation values obtained by division into 8×8 sub-blocks suffice for prediction, the intra-frame predicting unit 13 may include only the circuit components related to 4×4 sub-blocks and 8×8 sub-blocks. Alternatively, 8×8 prediction images may be generated using images generated through the prediction image generating sections 31-0 to 31-8 for the 4×4 prediction modes. Alternatively, a single prediction image generating section may have functions of generating prediction images for a plurality of prediction modes instead of prediction image generating sections for the individual 4×4 (or 8×8) prediction modes.

To achieve the functions of the intra-frame predicting unit 13 by software, parts or all of prediction image generating processes for a plurality of prediction modes relevant to the individual block sizes may be carried out in parallel.

FIGS. 4A and 4B illustrate a configuration of the first evaluation value calculating section 32 and that of the second evaluation value calculating section 33 for intra 4×4 prediction.

Referring to FIG. 4A, the intra-4×4 first evaluation value calculating section 32 includes a difference image generating portion 45, a SAD calculating portion 46, and a correction value calculating portion 47. The difference image generating portion 45 generates a difference image between the original image and each of the prediction images in the prediction directions output from the prediction image generating sections 31-0 to 31-8 for the 4×4 prediction modes 0 to 8.

The SAD calculating portion 46 calculates the SAD between the original image and the prediction image in each prediction mode for each 4×4 sub-block and determines the prediction mode relevant to the smallest SAD as an optimum prediction mode. In addition, the SAD calculating portion 46 accumulates the smallest SADs for sub-blocks in units of a macroblock to obtain a first evaluation value.

The correction value calculating portion 47 outputs a value obtained by multiplying the first evaluation value by a desired correction coefficient (including 1). If correction is not needed, the correction value calculating portion 47 may be omitted.

Referring to FIG. 4B, the second evaluation value calculating section 33 includes a Hadamard transforming portion 48 and a coefficient accumulating portion 49. The Hadamard transforming portion 48 performs Hadamard transform on each 4×4 sub-block of the original image and outputs Hadamard transform coefficients after transform. The coefficient accumulating portion 49 calculates a cumulative value of Hadamard transform coefficients. The cumulative value of the transform coefficients serves as a second evaluation value.

The intra-8×8 first evaluation value calculating section 36, the 8×8-orthogonal-transform second evaluation value calculating section 37, the intra-16×16 first evaluation value calculating section 40, and the 16×16-orthogonal-transform second evaluation value calculating section 41 also have the same configurations as those in FIGS. 4A and 4B.

Figure 5:
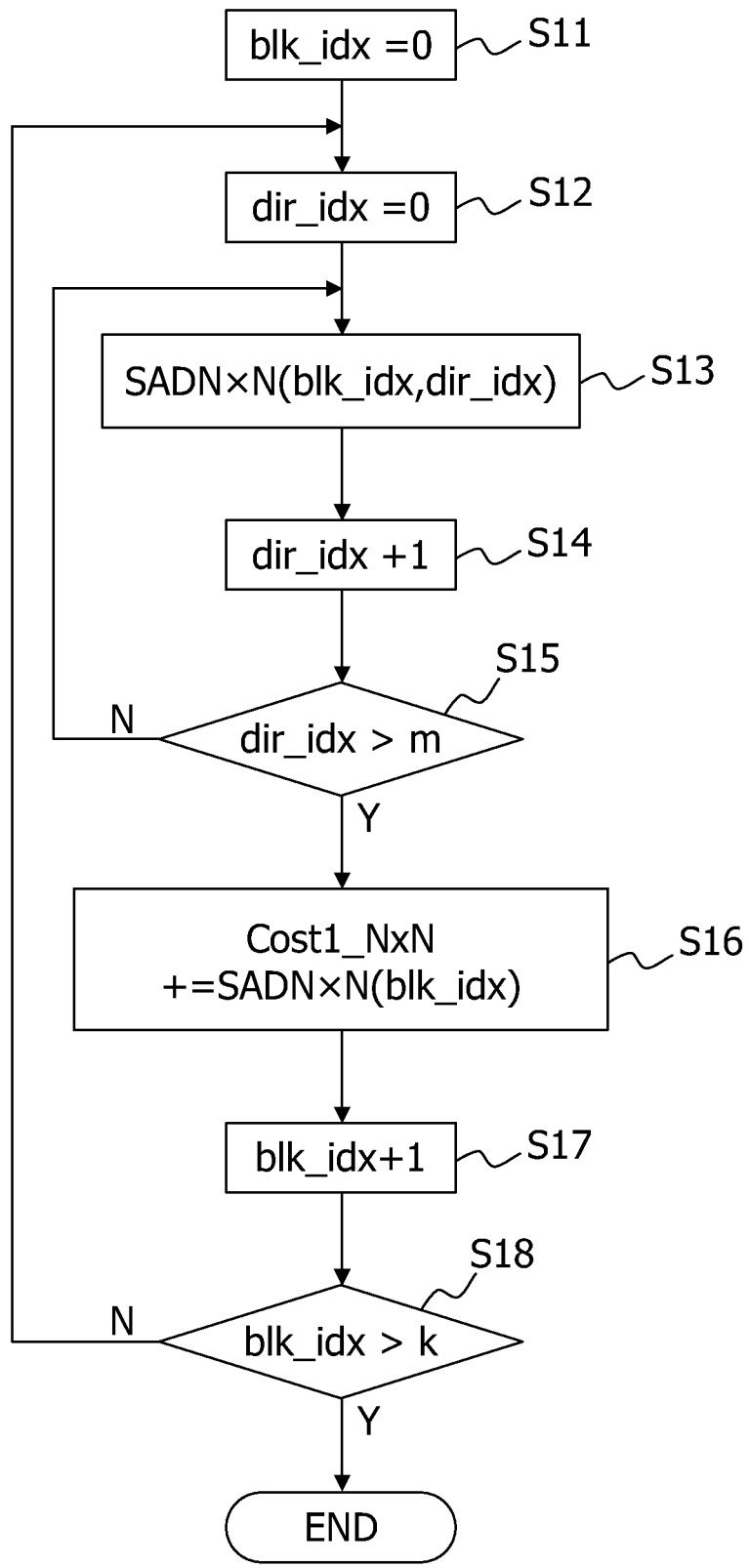
FIG. 5 is a flowchart of a first evaluation value calculating process.

FIG. 5 is a flowchart of a first evaluation value calculating process. This first evaluation value calculating process represents a processing operation by each of the intra-4×4 first evaluation value calculating section 32, the intra-8×8 first evaluation value calculating section 36, and the intra-16×16 first evaluation value calculating section 40.

A variable that specifies a sub-block in a macroblock of 16×16 pixels will be called "block index blk_idx" and a variable that specifies a prediction mode (prediction direction) will be called "direction index dir_idx".

Referring to FIG. 5, in operation S11, an initial value "0" is set to the block index blk_idx. In operation S12, an initial value "0" is similarly set to the direction index dir_idx that specifies a prediction direction.

In operation S13, the sum of absolute differences SADN×N(blk_idx, dir_idx) between an original image and a prediction image in the prediction direction specified by the direction index dir_idx is calculated for the sub-block specified by the block index blk_idx.

The sum of absolute differences in the prediction direction specified by the direction index dir_idx for the sub-block specified by the block index blk_idx can be calculated using the following equation.

$$SADN{\times}N(blk\_idx, dir\_idx) = \Sigma(i,j)|Org(i,j) - Pred(i,j)|$$

where Org(i, j) denotes a pixel value in the ith row and the jth column of the original image and Pred(i, j) indicates a pixel value in the ith row and the jth column of the prediction image. This equation represents the sum of absolute differences between the original image Org(i, j) and the prediction image Pred(i, j).

When the quantizing unit 15 quantizes transform coefficients using a quantization value qp (quant parameter) and b(dir_idx) denotes a virtual bit rate estimated to be necessary for variable length coding of prediction mode information, the sum of absolute differences may be calculated in consideration of the bit rate for prediction mode information using the following equation, where lambda(qp) denotes a parameter proportional to the quantization value qp.

$$SADN \times N(blk\_idx, dir\_idx) =$$
$$\Sigma(i,j)|Org(i,j) - Pred(i,j)| + \text{lambda}(qp) \times b(dir\_idx)$$

This equation represents the sum of absolute differences (SAD) with consideration given to the bit rate of prediction mode information.

In operation S14, "1" is added to the direction index dir_idx. Processing in operation S14 is to specify the next prediction mode (prediction direction).

In operation S15, whether the value of the direction index dir_idx is greater than a maximum value m indicating the prediction mode number is determined. For example, when the block size is 4×4 or 8×8, the maximum value m indicating the prediction mode number is "8". Accordingly, whether dir_idx>8 is determined in operation S15.

If the direction index dir_idx is not greater than the maximum value m (NO in operation S15), the process is returned to operation S13. The sum of absolute differences SADN×N (blk_idx, dir_idx) in the newly specified prediction direction is calculated in operation S13.

If the direction index dir_idx is greater than the maximum value m (YES in operation S15), the process proceeds to operation S16. In operation S16, the prediction direction relevant to the smallest value among the sums of absolute differences SADN×N(blk_idx, dir_idx) in the prediction directions is determined as an optimum prediction direction, the prediction mode number is stored, and the smallest sum of absolute differences SADN×N(blk_idx, dir_idx) is added to a cost value Cost1_N×N.

The above-described operations S12 to S16 obtain the optimum prediction direction (prediction mode) for one N×N sub-block and the sum of absolute differences SADN×N (blk_idx, dir_idx) in the prediction direction.

After completion of the calculation of the SADs in all of the prediction modes for one N×N sub-block, the process proceeds to operation S17, in which "1" is added to the block index blk_idx. In operation S17, the next sub-block is specified.

In operation S18, whether a value obtained by adding "1" to the block index blk_idx is greater than a maximum value k indicating the number of divided blocks (blk_idx>k) is determined. For the maximum value k indicating the number of divided blocks, for example, when the block size is of 4×4 pixels, the maximum value k indicating the number of divided blocks is "16". When the block size is of 8×8 pixels, the maximum value k indicating the number of divided blocks is "4".

If the block index blk_idx is not greater than the maximum value k (NO in operation S18), the process is returned to operation S12. The initial value "0" is set to the direction index dir_idx and the above-described process is repeated.

The sums of absolute differences SADN×N(blk_idx, dir_idx) in the individual prediction directions for the sub-block specified by the block index blk_idx are calculated and, after that, the smallest value among them is obtained. The smallest sum of absolute differences SADN×N(blk_idx, dir_idx) is added to the cost value Cost1_N×N.

The above-described process is repeated until the block index reaches the maximum value, so that a value obtained by accumulating the smallest sums of absolute differences SADN×N(blk_idx, dir_idx) for the individual sub-blocks in units of a macroblock can be obtained as the cost value Cost1_N×N. The cost value Cost1_N×N obtained by accumulating the smallest sums of absolute differences SADN×N(blk_idx, dir_idx) between the original image and the prediction image for the individual sub-blocks in units of a macroblock is a first evaluation value for the N×N block size.

A second evaluation value calculating process will now be described. In an embodiment, a original image is subjected to Hadamard transform and the sums of absolute values of Hadamard transform coefficients (SAT) for individual sub-blocks are accumulated in units of a macroblock to obtain a second evaluation value.

For example, when a macroblock of 16×16 pixels in the original image Org is divided into 16 sub-blocks each composed of 4×4 pixels, Hadamard transform coefficients $A_{4\times4, blk\_idx}$ of each sub-block are expressed using a determinant as follows.

$$A_{4\times4,blk\_idx} = H_4 \cdot Org \cdot H_4^T$$

The determinant $H_4$ indicates a value shown in FIG. 6A. $H_4^T$ is the transpose of the determinant $H_4$.

The sum of absolute values SAT4(blk_idx) of Hadamard transform coefficients $A_{4\times4, blk\_idx}$ (excluding a DC component) for an arbitrary 4×4 sub-block is expressed by the following equation (1).

$$SAT4(\text{blk\_idx}) = \sum_{(i,j)\neq(0,0)} |A_{4\times4,blk\_idx}(i, j)| \quad (1)$$

When each coefficient is weighted, the sum of absolute values SAT4(blk_idx) can also be expressed by the following equation (2).

$$SAT4(\text{blk\_idx}) = \sum_{(i,j)} w(i, j) \cdot |A_{4\times4,blk\_idx}(i, j)| \quad (2)$$

Similarly, when a macroblock in the original image is divided into 4 sub-blocks each composed of 8×8 pixels, Hadamard transform coefficients $A_{8\times8, blk\_idx}$ of each sub-block are expressed using a determinant as follows.

$$A_{8\times8,blk\_idx} = H_8 \cdot Org \cdot H_8^T$$

The determinant $H_8$ indicates a value shown in FIG. 6B.

The sum of absolute values SAT8(blk_idx) of Hadamard transform coefficients (excluding a DC component) for an arbitrary 8×8 sub-block is expressed by the following equation (3).

$$SAT8(\text{blk\_idx}) = \sum_{(i,j)\neq(0,0)} |A_{8\times8,blk\_idx}(i, j)| \quad (3)$$

When each coefficient is weighted, the sum of absolute values SAT8(blk_idx) can be expressed by the following equation (4).

$$SAT8(\text{blk\_idx}) = \sum_{(i,j)} w(i, j) \cdot |A_{8\times8,blkidx}(i, j)| \quad (4)$$

In addition, the Hadamard transform coefficients $A_{8\times8, blk\_idx}$ of each 8×8 sub-block can be calculated using the following equation (5) on the condition that 4×4 sub-blocks are indicated by blkidx0 to blkidx3 in the raster scan order.

$$A_{8\times8,blk\_idx} = \frac{1}{2}\begin{pmatrix} 1 & 1 \\ 1 & -1 \end{pmatrix}\begin{pmatrix} A_{4\times4,blk\_idx0} & A_{4\times4,blk\_idx1} \\ A_{4\times4,blk\_idx2} & A_{4\times4,blk\_idx3} \end{pmatrix}\begin{pmatrix} 1 & 1 \\ 1 & -1 \end{pmatrix} \quad (5)$$

On the above-described assumption, the second evaluation value calculating process will now be described with reference to a flowchart of FIG. 7.

The second evaluation value calculating process represents a processing operation by each of the 4×4-orthogonal-transform second evaluation value calculating section 33, the 8×8-orthogonal-transform second evaluation value calculating section 37, and the 16×16-orthogonal-transform second evaluation value calculating section 41 in FIG. 3.

In operation S21, the sum of absolute values of Hadamard transform coefficients SATN×N(blk_idx) for an N×N sub-block specified by the block index blk_idx is calculated. Specifically, in operation S21, Hadamard transform is performed on each sub-block, e.g., each 4×4, 8×8, or 16×16 block and the sum of absolute values of Hadamard transform coefficients for the transformed image is calculated. At this time, the sum of absolute values of Hadamard transform coefficients excluding a DC component may be obtained.

In operation S22, the obtained sum of absolute values of Hadamard transform coefficients SATN×N(blk_idx) for the sub-block (specified by "blk_idx") is added to a second evaluation value Cost2_N×N.

In operation S23, "1" is added to the block index blk_idx to specify the next sub-block.

In operation S24, whether a value indicated by the block index blk_idx is greater than the maximum value k indicating the number of divided blocks is determined.

If the value indicated by the block index blk_idx is not greater than the maximum value k (NO in operation S24), the process is returned to operation S21. The sum of absolute values of Hadamard transform coefficients SATN×N(blk_idx) for the next sub-block is calculated.

By repeating the above-described operations S21 to S23, a cumulative value of the sums of absolute values of Hadamard transform coefficients SATN×N(blk_idx) of the individual sub-blocks can be obtained.

If the value indicated by the block index blk_idx is greater than the maximum value k (YES in operation S24), the process is terminated because calculation for all of the sub-blocks is completed.

FIGS. 8A to 8C are diagrams explaining second evaluation values for 4×4 and 8×8 sub-blocks. In FIGS. 8B and 8C, each sub-block with dashed lines is a block having a high cost value (second evaluation value). Each sub-block without dashed lines is a block having a low cost value.

FIG. 8B schematically illustrates second evaluation values for the sub-blocks obtained by dividing an original image including an edge illustrated in FIG. 8A into sub-blocks each composed of 4×4 pixels.

When the original image including the edge is subjected to Hadamard transform, the sum of absolute values of Hadamard transform coefficients SAT for each block including the edge is larger than that for each block excluding the edge. Referring to FIG. 8B, the sums of absolute values of Hadamard transform coefficients for six sub-blocks of the 16 sub-blocks are large values (high costs).

FIG. 8C schematically illustrates the sums (costs) of absolute values of Hadamard transform coefficients for sub-blocks obtained by dividing the image of FIG. 8A into sub-blocks each composed of 8×8 pixels. Referring to FIG. 8C, since the edge is included in three sub-blocks of the four sub-blocks, the sums of absolute values of Hadamard transform coefficients for the three sub-blocks are large values.

In the above-described case, a cumulative value (4×4 second evaluation value) of the sums of absolute values of Hadamard transform coefficients for the 4×4-pixel sub-blocks is smaller than a cumulative value (8×8 second evaluation value) of the sums of absolute values of Hadamard transform coefficients for the 8×8-pixel sub-blocks.

It is assumed that no significant difference exists between a first evaluation value for the 4×4-pixel sub-blocks and that for the 8×8-pixel sub-blocks. In this case, to encode the image including the edge illustrated in FIG. 8A, the 4×4 block size with the smaller second evaluation value is selected. Thus, the coding efficiency is increased and noise caused by the edge becomes less prominent.

FIG. 9 is a flowchart of a block size determining process. Calculation of a first evaluation value for the 4×4-pixel sub-blocks in operation S31 (the process of FIG. 5) is performed in parallel with calculation of a second evaluation value for the 4×4-pixel sub-blocks in operation S32 (the process of FIG. 7).

Figure 7:
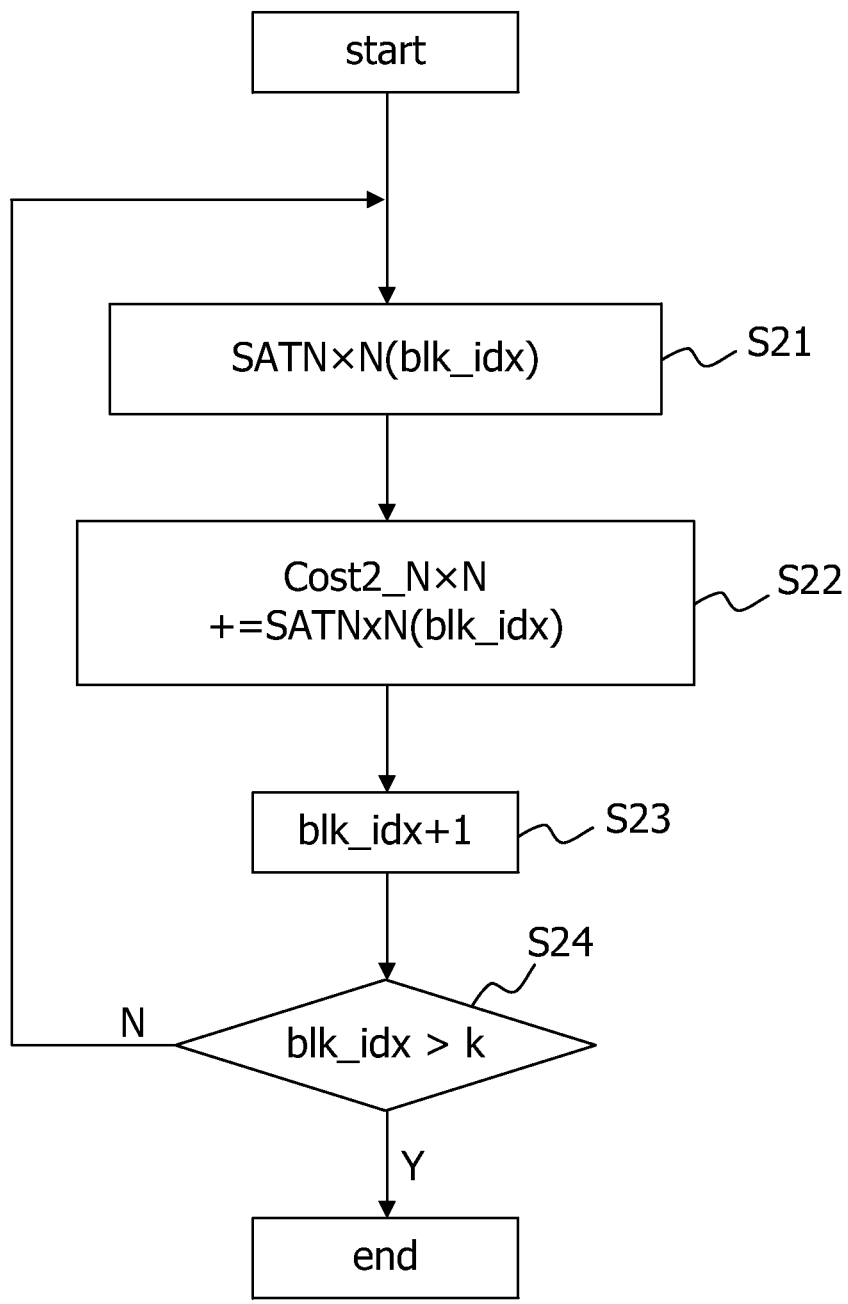
FIG. 7 is a flowchart of a second evaluation value calculating process.

Furthermore, calculation of a first evaluation value for the 8×8-pixel sub-blocks (the process of FIG. 5) is also performed in parallel with calculation of a second evaluation value for the 8×8-pixel sub-blocks (the process of FIG. 7).

In operation S35, the sum of the product of the first evaluation value Cost1_N×N for the N×N-pixel sub-blocks and a value α and the product of the second evaluation value Cost2_N×N therefor and a value β is calculated as a third evaluation value Cost3_N×N.

In operation S36, which of the intra-4×4 third evaluation value Cost3_N×N and the intra-8×8 third evaluation value Cost3_N×N is smaller than the other is determined. The block size relevant to the smaller third evaluation value is selected.

Figure 10A:
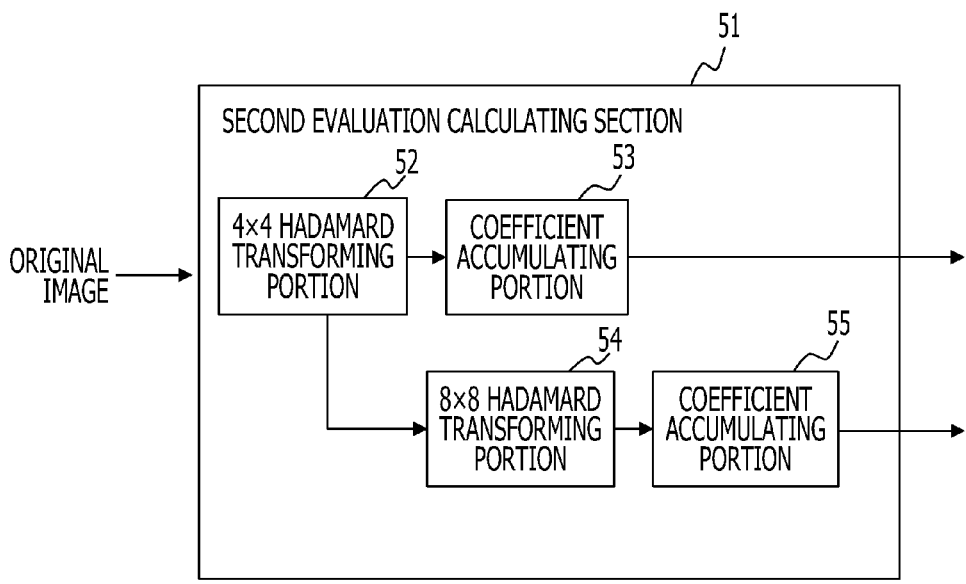
FIGS. 10A and 10B are diagrams illustrating second evaluation value calculating sections used when 8×8 Hadamard transform is calculated using 4×4 Hadamard transform.

FIG. 10A illustrates the configuration of a second evaluation value calculating section 51 used when 8×8 Hadamard transform is calculated using the result of calculation of 4×4 Hadamard transform.

The second evaluation value calculating section 51 includes a 4×4 Hadamard transforming portion 52, a coefficient accumulating portion 53, an 8×8 Hadamard transforming portion 54, and a coefficient accumulating portion 55.

The 4×4 Hadamard transforming portion 52 performs Hadamard transform on each sub-block of 4×4 pixels of an original image and outputs Hadamard transform coefficients for the 4×4 sub-block to the coefficient accumulating portion 53 and the 8×8 Hadamard transforming portion 54. The coefficient accumulating portion 53 calculates a cumulative value of the sums of absolute values of Hadamard transform coefficients for the 4×4 sub-blocks.

The cumulative value of the sums of absolute values of 4×4 Hadamard transform coefficients obtained by the coefficient accumulating portion 53 is output as a 4×4 second evaluation value.

The 8×8 Hadamard transforming portion 54 calculates the sum of absolute values of Hadamard transform coefficients for each 8×8 sub-block using the sum of absolute values of 4×4 Hadamard transform coefficients calculated by the 4×4 Hadamard transforming portion 52.

The coefficient accumulating portion 55 accumulates the sums of absolute values of Hadamard transform coefficients for the 8×8 sub-blocks in units of a macroblock. The cumulative value of the sums of absolute values of Hadamard transform coefficients obtained by the coefficient accumulating portion 55 is output as an 8×8 second evaluation value.

The second evaluation value calculating section 51 of FIG. 10A alone achieves the function of the 4×4-orthogonal-transform second evaluation value calculating section 33 of FIG. 4B and that of the 8×8-orthogonal-transform second evaluation value calculating section 37, namely, two functions. In this case, since the sums of absolute values of 8×8 Hadamard transform coefficients are calculated using the result of calculation of the sums of absolute values of 4×4 Hadamard transform coefficients, the time required for calculation of Hadamard transform for 8×8 sub-blocks can be reduced.

Figure 10B:
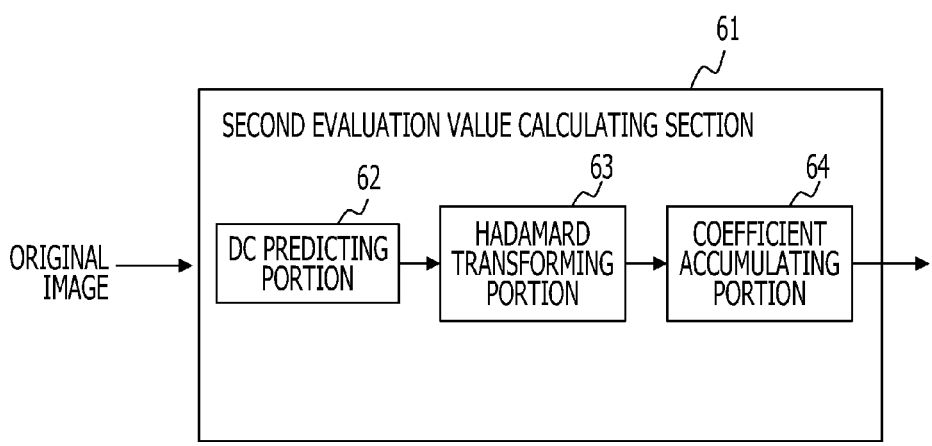

FIG. 10B illustrates the configuration of a second evaluation value calculating section 61 used when only DC prediction is performed prior to Hadamard transform.

The second evaluation value calculating section 61 includes a DC predicting portion 62, a Hadamard transforming portion 63, and a coefficient accumulating portion 64.

The DC predicting portion 62 generates a DC prediction image and outputs the difference image between an original image and the DC prediction image to the Hadamard transforming portion 63. The Hadamard transforming portion 63 performs Hadamard transform on the image including the difference in DC-component prediction values and calculates the sum of absolute values of Hadamard transform coefficients including a DC component for each sub-block. The coefficient accumulating portion 64 calculates a cumulative value of the sums of absolute values of Hadamard transform coefficients for the sub-blocks.

Since the second evaluation value calculating section 61 of FIG. 10B can calculate a second evaluation value for the original image including a DC component, an optimum block size can be selected in consideration of the DC component. Thus, the coding efficiency can be further increased.

In an embodiment, a cumulative value of transform coefficients for orthogonal transform (e.g., Hadamard transform) on an original image is obtained as a second evaluation value. A second evaluation value may be calculated using another method other than orthogonal transform.

For example, an image of 16×16 pixels is divided into 16 sub-blocks each composed of 4×4 pixels, an average of pixel values of each sub-block is calculated, and a dispersion n(blk_idx) of each sub-block is calculated. A cumulative value of the dispersions n(blk_idx) of the sub-blocks may be obtained as a second evaluation value.

An average ave and a dispersion n(blk_idx) of a sub-block of 4×4 pixels can be expressed by the following expression (6).

$$v(\text{blk\_idx}) = \frac{1}{16}\sum_{(i,j)} \cdot (Org(i,j) - ave)^2 \, ave = \frac{1}{16}\sum_{(i,j)} \cdot Org(i,j) \quad (6)$$

A method of determining a first evaluation value, a second evaluation value, and a block size will now be described using an image of 16×16 pixels illustrated in FIG. 11 as an example.

For ease of explanation, it is assumed that each peripheral pixel has a pixel value of "128". In this case, the sum of absolute differences (SAD) between the original image and the prediction image for the 4×4-pixel sub-block having the above-described pixel values and the SAD between the original image and the prediction image for the 8×8-pixel sub-block having the pixel values are each "3824".

For example, in the JM (Joint Model), the number of bits used for selection of a prediction mode is added to a cost value for evaluation of coding efficiency. When let λ denote a coefficient proportional to a quantization value, a cost value for an N×N-pixel sub-block according to the JM can be expressed as Cost1_N×N=SAD+λ×the number of bits.

Referring to FIG. 11, the cost value (first evaluation value) Cost1_4×4 for the 4×4-pixel sub-blocks is greater than the cost value (first evaluation value) Cost1_8×8 for the 8×8-pixel sub-blocks. For ease of explanation, it is assumed that Cost1_4×4=4000 and Cost1_8×8=3900.

When a sub-block size is selected in consideration of only the above-described evaluation values, the 8×8 sub-block size is selected.

When the sums of absolute values of Hadamard transform coefficients SAT4(blk_idx) for the 4×4 sub-blocks of the image illustrated in FIG. 11 are calculated, values are obtained, as illustrated in FIG. 12A.

When the sums of absolute values of Hadamard transform coefficients SAT4(blk_idx) for the 4×4 sub-blocks in FIG. 12A are accumulated in units of a macroblock, the cumulative value, serving as a second evaluation value Cost2_4×4, is "7416".

Similarly, when the sums of absolute values of Hadamard transform coefficients SAT8(blk_idx) for the 8×8 sub-blocks of the image in FIG. 11 are calculated, values are obtained, as illustrated in FIG. 12B.

When the sums of absolute values of Hadamard transform coefficients SAT8(blk_idx) for the 8×8 sub-blocks in FIG. 12B are accumulated in units of a macroblock, the cumulative value, serving as a second evaluation value Cost2_8×8, is "11844".

Assuming that the weighting factor α for the first evaluation value is set to 1 and the weighting factor β for the second evaluation value is set to 0.5, a third evaluation value for the 4×4 sub-blocks and that for the 8×8 sub-blocks are as follows.

Cost3_4×4=4000+0.5×7416=7708

Cost3_8×8=3900+0.5×11844=9822

In this case, since the third evaluation value Cost3_4×4 for the 4×4 sub-blocks is smaller than that for the 8×8 sub-blocks, the 4×4 block size is selected as a block size for higher coding efficiency.

In the foregoing embodiment, the sum of absolute differences (SAD) between an original image and a prediction image in each of a plurality of prediction modes for each predetermined size sub-block or block of 4×4, 8×8, or 16×16 pixels is calculated. As for each sub-block size, the smallest values of the sums of absolute differences for the sub-blocks are accumulated in units of a macroblock to obtain a first evaluation value Cost1_N×N. In addition, orthogonal transform is performed on each predetermined size block or sub-block of the original image, the sum of absolute values of transform coefficients (or dispersions) for each sub-block after transform is calculated, and the sums of absolute values of transform coefficients for the sub-blocks are accumulated in units of a macroblock to obtain a second evaluation value. An optimum block size and an optimum prediction direction are selected on the basis of the values for the block sizes, each value being obtained by adding the first and second evaluation values for the corresponding block size (or adding the product of the first evaluation value and a weighting factor and the product of the second evaluation value and another weighting factor). Consequently, a prediction image can be generated using the block size and prediction direction which provide high coding efficiency. In addition, the block size that allows an edge image to become less prominent can be selected. The second evaluation value can be obtained from the sums of absolute values of Hadamard transform coefficients for sub-blocks. Accordingly, the processing time required for arithmetic operation can be reduced, thus increasing processing speed.

The foregoing embodiment has been described with respect to the case where the sums of absolute values of Hadamard transform coefficients for sub-blocks of the original image are calculated. Another orthogonal transform other than Hadamard transform may be used. Furthermore, another value other than a Hadamard transform coefficient or a dispersion may be used so long as the value can represent a frequency characteristic of an original image.

As described above, the video encoding apparatus and method to which the present invention is applied can select a proper block size and reduce noise.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention, the scope of which is defined in the claims and their equivalents.

What is claimed is:

1. A video encoding apparatus, comprising:
  a computer configured to implement an operation with the video encoding apparatus that includes:
    generating a prediction image in each of a plurality of intra-frame prediction modes in units of a sub-block determined by each block size;
    calculating a first evaluation value based on a difference between an original image and prediction images in the intra-frame prediction modes for sub-blocks determined by each block size using data other than a value of a transformation of the original image;

accumulating values representing frequency characteristics of the original image for the sub-block determined by each block size in units of a macroblock to obtain a second evaluation value using the value of the transformation of the original image, the calculating and the accumulating being executed in parallel; and selecting one of different block sizes based on a comparison of the first evaluation value and the second evaluation value, for each of the different block sizes and performing an intra-frame prediction in units of a sub-block determined using said one of different block sizes, wherein a block size is selected based on a sum of the product of each first evaluation value and a weighting factor and the product of each second evaluation value and another weighting factor, alternatively, sums of absolute differences each of which the product of a value proportional to a quantization value for orthogonal transform and a bit rate for prediction mode information is added as an offset value to.

2. The apparatus according to claim 1, wherein the second evaluation value is obtained by performing orthogonal transform on the original image, calculating a sum of absolute values of orthogonal transform coefficients for each sub-block, and accumulating sums of absolute values of orthogonal transform coefficients for the sub-blocks in units of a macroblock to obtain a cumulative value as the second evaluation value.

3. The apparatus according to claim 1, wherein the first evaluation value is obtained by calculating a sum of absolute differences between the original image and the prediction image for each sub-block and accumulating the sums of absolute differences for the sub-blocks in units of a macroblock to obtain a cumulative value as the first evaluation value.

4. The apparatus according to claim 1, wherein Hadamard transform is performed on the original image in units of the sub-block, a sum of absolute values of Hadamard transform coefficients excluding a DC component for each sub-block is calculated, and sums of absolute values of Hadamard transform coefficients for the sub-blocks in units of a macroblock are accumulated to obtain a cumulative value as the second evaluation value.

5. The apparatus according to claim 2, wherein
the generating includes:
generating prediction images in a plurality of prediction modes in units of a 4×4 sub-block; and
generating prediction images in a plurality of prediction modes in units of an 8×8 sub-block,
calculating the first evaluation value includes:
calculating a sum of absolute differences between the original image and each of the prediction images in the plurality of prediction modes for each 4×4 sub-block and accumulating the sums of absolute differences for the 4×4 sub-blocks in units of a macroblock to obtain a cumulative value as the first evaluation value for the 4×4 block size; and
calculating a sum of absolute differences between the original image and each of the prediction images in the plurality of prediction modes for each 8×8 sub-block and accumulating the sums of absolute differences for the 8×8 sub-blocks in units of a macroblock to obtain a cumulative value as the first evaluation value for the 8×8 block size, calculating the second evaluation value includes:
calculating a sum of absolute values of orthogonal transform coefficients for each 4×4 sub-block of the original image and accumulating the sums of absolute values of orthogonal transform coefficients for the 4×4 sub-blocks in units of a macroblock to obtain a cumulative value as the second evaluation value for the 4×4 block size; and
calculating a sum of absolute values of orthogonal transform coefficients for each 8×8 sub-block of the original image and accumulating the sums of absolute values of orthogonal transform coefficients for the 8×8 sub-blocks in units of a macroblock to obtain a cumulative value as the second evaluation value for the 8×8 block size, and
the selecting including comparing a value obtained by adding the first evaluation value and the second evaluation value for the 4×4 block size with a value obtained by adding the first evaluation value and the second evaluation value for the 8×8 block size and selecting a block size relevant to a smaller value as the block size used for intra-frame prediction.

6. The apparatus according to claim 1, wherein the second evaluation value is obtained by:
generating a DC prediction difference image as a difference between the original image and the DC-component prediction image;
performing Hadamard transform on the DC prediction difference image and calculating a sum of absolute values of Hadamard transform coefficients for each sub-block; and
accumulating the sums of absolute values of Hadamard transform coefficients for the sub-blocks in units of a macroblock to obtain a cumulative value as the second evaluation value.

7. The apparatus according to claim 1, wherein obtaining the second evaluation value calculates dispersions of pixels of each sub-block of the original image and accumulates the dispersions of the sub-blocks in units of a macroblock to obtain a cumulative value as the second evaluation value.

8. A video encoding method, the method comprising:
generating a prediction image in each of a plurality of intra-frame prediction modes in units of a sub-block determined by each block size;
calculating a first evaluation value based on a difference between an original image and prediction images in the intra-frame prediction modes for sub-blocks determined by each block size using data other than a value of a transformation of the original image;
accumulating values indicating frequency characteristics of the original image for the sub-blocks determined by each block size in units of a macroblock to obtain a second evaluation value using the value of the transformation of the original image, the calculating and the accumulating being executed in parallel; and
selecting one of different block sizes based on a comparison of the first evaluation value and the second evaluation value, for each of the different block sizes and performing an intra-frame prediction in units of a sub-block determined using said one of different block sizes,
wherein a block size is selected based on a sum of the product of each first evaluation value and a weighting factor and the product of each second evaluation value and another weighting factor, alternatively, sums of absolute differences each of which the product of a value proportional to a quantization value for orthogonal transform and a bit rate for prediction mode information is added as an offset value to.

9. The method according to claim 8, wherein orthogonal transform is performed on the original image, a sum of absolute values of orthogonal transform coefficients for each sub-block is calculated, and sums of absolute values of orthogonal transform coefficients for the sub-blocks are accumulated in units of a macroblock to obtain a cumulative value as the second evaluation value.

10. The method according to claim 8, wherein a sum of absolute differences between the original image and the prediction image for each sub-block is calculated and sums of absolute differences for the sub-blocks are accumulated in units of a macroblock to obtain a cumulative value as the first evaluation value.

11. The method according to claim 8, wherein Hadamard transform is performed on the original image in units of the sub-block, sum of absolute values of Hadamard transform coefficients excluding a DC component for each sub-block is calculated, and sums of absolute values of Hadamard transform coefficients for the sub-blocks are accumulated in units of a macroblock to obtain a cumulative value as the second evaluation value.

12. The method according to claim 8, wherein
   a DC prediction difference image is generated as a difference between the original image and the DC-component prediction image,
   Hadamard transform is performed on the DC prediction difference image and sum of absolute values of Hadamard transform coefficients for each sub-block is calculated, and
   the sums of absolute values of Hadamard transform coefficients for the sub-blocks are accumulated in units of a macroblock to calculate a cumulative value as the second evaluation value.

13. A video encoding method, comprising:
   calculating a sum of absolute differences between an original image and a prediction image in a prediction direction specified for each of predetermined sub-blocks of the original image using data other than a value of a transformation of the original image;
   accumulating a value corresponding with smallest sums of absolute differences for each individual sub-block in units associated with the value of the transformation of the original image, the calculating and the accumulating being executed in parallel; and
   performing an intra-frame prediction in the units of a sub-block determined by any one of different block sizes selected based on a comparison of the sum of the absolute differences calculated and the value of the smallest sums of absolute differences accumulated, for each of the different block sizes,
   wherein the any one of different block sizes is selected based on a sum of the product of each value resulting from the calculating and a weighting factor and the product of each value resulting from the accumulating and another weighting factor, alternatively, sums of absolute differences each of which the product of a value proportional to a quantization value for orthogonal transform and a bit rate for prediction mode information is added as an offset value to.

14. The apparatus according to claim 1, wherein
   the selecting calculates third values based on the first evaluation value and the second evaluation value, and selects the one of the different block sizes based on the third values.

15. The method according to claim 8, wherein
   the selecting calculates third values based on the first evaluation value and the second evaluation value, and selects the one of the different block sizes based on the third values.

16. The apparatus according to claim 1, wherein
   wherein the one of the different block sizes is selected based on a comparison of a cumulative value of the first evaluation value and the second evaluation value, where the cumulative value includes a combination of values before a transformation and values after the transformation.

17. The method according to claim 8, wherein
   wherein the one of the different block sizes is selected based on a comparison of a cumulative value of the first evaluation value and the second evaluation value, where the cumulative value includes a combination of values before a transformation and values after the transformation.

18. The video encoding method according to claim 13, wherein
   wherein intra-frame prediction in the units of the sub-block is performed based on a comparison of a cumulative value of the sum of the absolute differences and the value corresponding with the smallest sums of absolute differences, where the cumulative value includes a combination of values before a transformation and values after the transformation.

* * * * *

UNITED STATES PATENT AND TRADEMARK OFFICE
CERTIFICATE OF CORRECTION

PATENT NO. : 9,106,917 B2
APPLICATION NO. : 12/791205
DATED : August 11, 2015
INVENTOR(S) : Satoshi Shimada Page 1 of 1

It is certified that error appears in the above-identified patent and that said Letters Patent is hereby corrected as shown below:

In the claims,

Claim 16, Column 18, Line 24

Before "the one" delete "wherein".

Claim 17, Column 18, Line 31

Before "the one" delete "wherein".

Claim 18, Column 18, Line 39

Before "intra-frame" delete "wherein".

Signed and Sealed this
First Day of December, 2015

Michelle K. Lee
*Director of the United States Patent and Trademark Office*